United States Patent [19]

Stockton

[11] 4,153,983

[45] May 15, 1979

[54] CYLINDER WALL REPAIR

[76] Inventor: Elmer A. Stockton, 11823 Jamestown Rd., Dallas, Tex. 75230

[21] Appl. No.: 651,172

[22] Filed: Jan. 21, 1976

[51] Int. Cl.$^2$ .......................... B23P 7/00; F02F 00/00
[52] U.S. Cl. ............................... 29/401 D; 29/401 C; 29/456; 29/457; 123/193 C
[58] Field of Search ............... 164/108, 120; 29/527.2, 29/401 D, 401 B, 401 F, 401 R, 456, 457, 402; 123/193 C

[56] References Cited

U.S. PATENT DOCUMENTS

| 1,437,904 | 12/1922 | Moomaw | 123/193 C |
|---|---|---|---|
| 1,459,039 | 6/1923 | Viale | 123/193 C |
| 1,896,098 | 2/1933 | Poyer | 123/193 C |
| 1,924,448 | 8/1933 | Leighton | 29/149.5 R |
| 2,266,319 | 12/1941 | Hobbs | 29/149.5 R |
| 2,311,329 | 2/1943 | Caminez | 123/193 C |
| 2,326,176 | 8/1943 | Schierenbeck | 29/456 |
| 2,412,587 | 12/1946 | Larson | 29/401 X |
| 3,165,983 | 1/1965 | Thomas | 123/193 C X |
| 3,219,397 | 11/1965 | Heldenbrand et al. | 29/527.2 X |

FOREIGN PATENT DOCUMENTS

| 1576407 | 5/1970 | Fed. Rep. of Germany | 123/193 C |
| 2243515 | 3/1973 | Fed. Rep. of Germany | 123/193 C |

Primary Examiner—C. W. Lanham
Assistant Examiner—V. K. Rising
Attorney, Agent, or Firm—Hubbard, Thurman, Turner, Tucker & Glaser

[57] ABSTRACT

Cylinder wall repair wherein worn or damaged areas of the cylinder are restored. The cylinder housing is rebored and threaded or ground. An externally threaded or grooved sleeve member is then screwed or inserted into the cylinder housing. The internal configuration and dimensions of the sleeve member may be designed to duplicate that of the original cylinder. The thread or groove design provides tunnels between the sleeve member and the cylinder housing.

12 Claims, 5 Drawing Figures

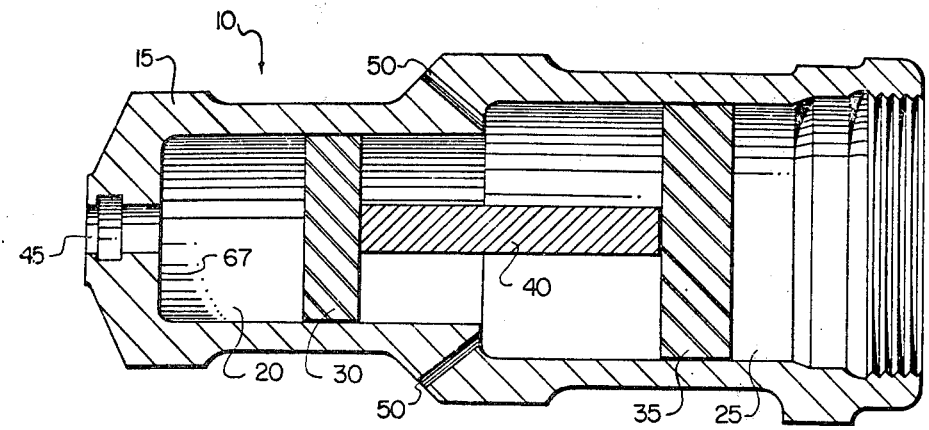
FIG. 1
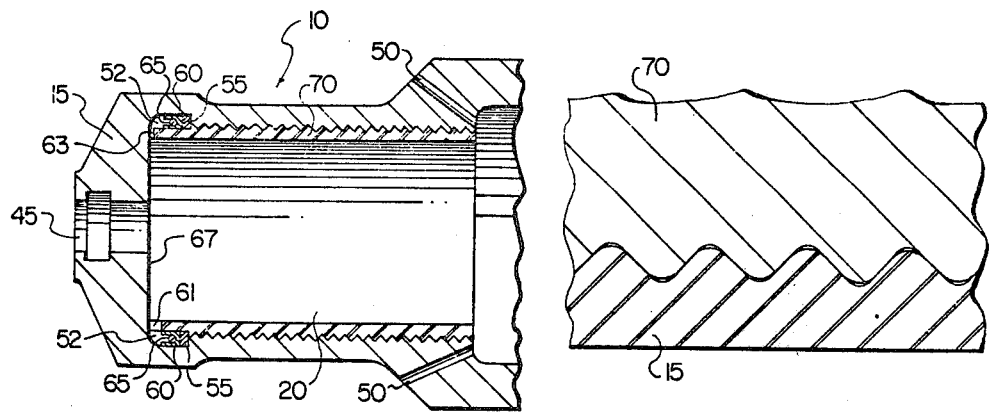
FIG. 2
FIG. 4
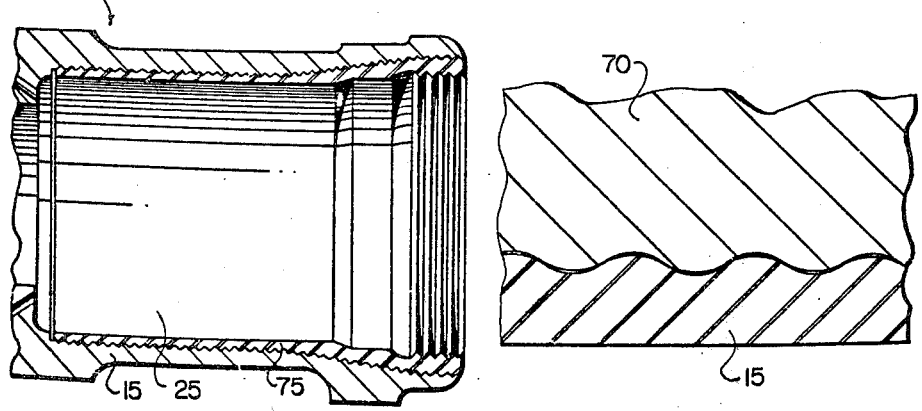
FIG. 3
FIG. 5

CYLINDER WALL REPAIR

BACKGROUND OF THE INVENTION

This invention relates to the repair of worn or damaged areas of cylinders and, in particular, to the repair of cylinder walls without necessarily changing the bore dimensions thereof.

As modern technology gets more complex, the machines that result therefrom correspondingly increase in complexity and expense. In addition, in recent years there has been a tendency for this modern technology to be introduced all over the populated world. The foregoing factors have contributed to the adoption of standardized parts as an accepted practice in machine design. This is for a variety of reasons. For example, the use of standardized parts leads to decreased unit cost. Additionally, repairs are simplified because replacement parts need not be modified if they conform to the standards set for that part. Still further, the distribution of parts is simplified since only a limited number of parts need be stocked. This latter factor is significant when it is considered that many complex machines may be in rather remote parts of the world.

The foregoing is especially significant in the case of airplanes which fly to all parts of the world and are subject to severe stresses and normal wear that repairs often must be instituted at virtually inaccessible locations. It is therefore extremely desirable to have standardization of parts so that replacement parts for repair can be flown to the damaged aircraft and incorporated therein without there being any worry about the part not being the proper size. One particular type item peculiarly susceptible to the problem of standardization are cylinders used in transmitting hydraulic pressure, such as for aircraft brakes. The fluid utilized in these cylinders occasionally gets contaminated with metallic particles and other foreign matter and the pistons within the cylinders grind the particles into the cylinder walls, causing wearing thereof. This wear destroys the seal between the piston and the cylinder wall, resulting in pressure leaks and eventual malfunction of the hydraulic system. It is therefore oftentimes necessary to repair the inner cylinder wall. This may be done in a variety of fashions. For example, the entire cylinder may be replaced. This is extremely undesirable as these cylinders may be exceedingly expensive, certain cylinders used in aircraft (brake) systems costing on the order of several thousands of dollars each. Another method of repair is to rebore and refinish the cylinder walls. A problem with this approach is that the diameter of the cylinder is increased by this method, necessitating the replacement of the original piston by an oversized piston. This latter procedure is unsatisfactory because the pistons are then not of standard size and the strength of the assembly is adversely affected. In order to overcome these disadvantages, the prior art has developed a process wherein the cylinder is rebored and material is plated or otherwise deposited on the inside of the cylinder to build up the inner walls and bring the diameter back down to the original diameter so that standard pistons may be utilized. This latter approach has disadvantages. For example, typical aircraft hydraulic cylinders are made of an aluminum alloy and the plating material has typically been hard chrome, nickel or other deposited materials. Because of the difference in coefficient of thermal expansion and ductility of the base material and the plated material, the plated walls have shown a tendency to crack. Another approach in the past has been to rebore the cylinder and press fit a sleeve therein, the inner diameter of the sleeve being the same as the original diameter of the cylinder. However, the hydraulic systems utilized in aircraft brake systems have extremely high fluid pressures, sometimes on the order of 3,000 pounds per square inch. This high pressure can actually drive the sleeve out of the cylinder. It is therefore desirable to have some way of repairing cylinders which overcomes all the disadvantages of the prior art approaches but still allows for the standardization of parts.

SUMMARY OF THE INVENTION

In accordance with principles illustrative of this invention, cylinder wall repair is effected by reboring the cylinder and threading or grooving the rebored cylinder to form threads or grooves therein. An externally threaded or grooved sleeve, suitably of stainless steel, having a desired internal configuration which can be identical to the original internal configuration of the cylinder is then inserted into the threaded or grooved rebored cylinder. A thread or groove with rounded peaks and valleys is advantageously utilized, such a thread or groove having no sharp edges, thereby reducing the tendency for the sleeve or the cylinder to crack from fatigue. The particular thread or groove utilized has different radii of curvature for the peaks and valleys of the threads or grooves, forming at least one tunnel between the sleeve and the cylinder. The tunnel may, in combination with a unidirectional or other seal at one end of the sleeve, provide a high pressure relief between the sleeve and the cylinder. This also permits testing of the seal since the contact between the sleeve and the cylinder does not provide any seal effect.

DESCRIPTION OF THE DRAWINGS

The foregoing will be more readily understood upon reading the following description in conjunction with the drawings in which:

FIG. 1 depicts a cross-sectional view of a typical aircraft brake deboost cylinder which is an exemplary environment in which the principles of this invention may be utilized to repair the inner walls thereof;

FIG. 2 depicts a cross-sectional view of the small end of the cylinder of FIG. 1 with a repair sleeve inserted therein in accordance with the principles of this invention;

FIG. 3 depicts a cross-sectional view of the large end of the cylinder of FIG. 1 with a repair sleeve inserted therein in accordance with the principles of this invention;

FIG. 4 depicts an enlarged cross-sectional view of a thread design advantageously utilized in accordance with the principles of this invention; and FIG. 5 depicts an enlarged cross-sectional view of a groove design advantageously utilized in accordance with the principles of this invention.

DESCRIPTION OF THE PREFERRED EMBODIMENT

Referring now to FIG. 1, depicted therein is a cross-sectional view of an airplane brake deboost cylinder 10 to which the repair principles of the present invention can be advantageously applied. Cylinder 10 is seen to comprise a hollow housing 15, typically made of an aluminum alloy. The interior of housing 15 includes a small bore portion 20 and a large bore portion 25. Internal to cylinder 10 are pistons 30 and 35 connected by rod 40, with piston 30 being in small bore portion 20 and piston 35 being in large bore portion 25. The function of deboost cylinder 10 is to lower hydraulic pressure from one end of the cylinder to the other end. Fluid under high pressure enters small bore portion 20 through opening 45. This pressure is transmitted through piston 30, rod 40 and piston 35 to fluid in large bore portion 25. The pressure applied to the fluid in large bore portion 25 is related to the pressure on the fluid in small bore portion 20 inversely as the cross-sectional areas of the bores of the two portions of cylinder 10 are related. For example, if large bore portion 25 has twice the cross-sectional area of small bore portion 20, the pressure applied to the fluid in large bore portion 25 is half the pressure of the fluid in small bore portion 20. Cylinder housing 15 has a plurality of openings 50 venting to the atmosphere the region between pistons 30 and 35 in order to avoid pressurizing or de-pressurizing that region when the pistons move. It is thus apparent that because of the high fluid pressures and the venting to the atmosphere that very tight seal requirements must be maintained between pistons 30 and 35 and the inner walls of cylinder 10. Any wearing of the inner walls of cylinder 10 will result in a loss of fluid pressure and a subsequent loss of the fluid itself.

FIG. 2 depicts a cross-sectional view of the small bore portion 20 of cylinder 10 having its inner wall repaired in accordance with the principles of this invention. The repair process is initiated by enlarging the bore of small bore portion 20 by a predetermined amount. The inner wall of the enlarged bore is then machined to create threads or grooves therein. As part of the reboring operation, a groove 52 may be created at the end of small bore portion 20. A seal illustratively comprising back-up ring 55 and U-shaped seal member 60 is then inserted in groove 52 and a stainless steel ring 65 is inserted in the mouth of seal member 60 to keep it open. A sleeve member 70 with external threads is then inserted into housing 15. If threads are utilized, as shown in FIG. 4, the sleeve is screwed into the housing. If annular grooves are utilized, as shown in FIG. 5, the housing may be heated and the sleeve cooled so that the sleeve may then be pushed into the housing, the grooves maintaining the sleeve in place when the temperatures are equalized. The internal diameter of sleeve member 70 can be identical to the original bore dimensions of the small bore portion 20 of housing 15. Therefore, an identical piston 30 may be utilized. Back-up ring 55 and seal member 60 are flexible, preferably of a material such as teflon or ethylene propylene. Thus, fluid pressure applied to the mouth of seal member 60 will force its walls outward against housing 15 and sleeve member 70, and slots 61 are preferably provided in the end 63 of sleeve 70 for pressurizing the seal 60. However, fluid under pressure applied to back-up ring 55 will pass between seal member 60 and housing 15 and sleeve member 70. A unidirectional seal effect is therefore provided. It should be noted that a simple O ring or other suitable seal member can be utilized. The seal can be provided between the end 63 and the wall 67.

FIG. 3 depicts a cross-sectional view of the large bore area 25 of cylinder 10, repaired in accordance with the principles of this invention. As was done for the small bore portion of cylinder 10, if the large bore portion or thread area thereof is damaged, it is rebored and threaded or grooved. A sleeve member 75 having external threads or grooves is then inserted into housing 15. The internal configuration of sleeve member 75 can be identical to the original configuration of large bore portion 25, or any other desired configuration. It is thus seen that no change need be made to the dimensions of piston 35. No seals are required between sleeve 75 and housing 15 because there is no contact of hydraulic fluid with the sleeve-housing threads.

Referring now to FIG. 4, depicted therein is a thread design which provides synergistic advantages over prior art methods of cylinder repair. It is seen from the drawing that the threads have no sharp edges, rather they are rounded at their peaks and valleys. In addition, the roundedness of the peaks and valleys is attained using different radii of curvature for the peaks and valleys. The peaks have a larger radius of curvature than the valleys so that between peaks and valleys a small space is formed. This space forms a pair of helical tunnels between sleeve 70 and housing 15. Preferably, the flat wall portion of the threads are at a 45° angle to the cylinder axis, but this angle can vary as required to meet other requirements without adversely affecting the quality of the repair. It will be noted that only one helical tunnel is required, and such would be attained if only one pair of the peaks and valleys are of different radius.

FIG. 5 depicts a groove arrangement which may be substituted for the thread design shown in FIG. 4. The grooves are relatively shallow, their heights depending upon the coefficients of expansion of sleeve 70 and housing 15. The radii of curvature of the peaks and valley must differ so that a plurality of annular tunnels are formed between sleeve 70 and housing 15. The radii of curvature of the peaks and valley must differ so that a plurality of annular tunnels are formed between sleeve 70 and housing 15. The tunnels are joined for fluid communication by one or more generally longitudinal grooves (not shown) machined into the sleeve 70 and/or housing 15 to provide the same effect as the helical tunnels formed by the threaded embodiment shown in FIG. 4. As in the case of the threads, only one tunnel is required.

The above described arrangement provides a number of advantages over prior art cylinder repair techniques. The particular thread or groove design allows more than the normal contact area to absorb deformation pressures. The absence of sharp edges in the threads or grooves reduces cracking tendencies of the materials. The tunnels between the housing and the sleeve provides a means for testing the seal elements because the threads or grooves provide no seal effect and any seal effect must be from the seal itself. Additionally, if the seal should leak under pressure, the fluid will weep out harmlessly through the tunnels and then through openings 50.

It has been determined that cylinders having the above-described repair technique applied thereto are in many ways superior to the original equipment. For example, the addition of the thin-walled sleeve member increases the structural strength of the cylinder material removed in the reboring operation. Failure of the housing will not produce a catastrophic failure of the hydraulic unit because the repair sleeve will hold the housing together and maintain the hydraulic pressure, the sleeve having axial strength. In fact, it has been found that the cylinder housing can be entirely cut through in the thin intermediate region and the sleeve will hold the housing together and maintain the hydraulic pressure, the sleeve having axial strength. In fact, it has been found that the cylinder housing can be entirely cut through in the thin intermediate region and the sleeve will hold the heavy ends thereof. Furthermore, the repair sleeve has improved properties over the original cylinder housing including improved wear characteristics and corosion resistance, and in the event that the repair sleeve itself becomes worn, it is easily removable and replaceable.

Accordingly, there has been described a cylinder wall repair technique providing improved features over prior art repair techniques and over the original cylinder itself. It will be apparent to those skilled in the art that the above described arrangement is merely illustrative of the application of the principles of this invention. Numerous other variations, modifications and adaptations of the present invention will be apparent to those skilled in the art, and such as come within the spirit and scope of the appended claims are considered to be embraced by the present invention.

What is claimed is:

1. A method for repairing an internal wall of a cylinder adapted to receive a piston comprising the steps of:
   reboring the cylinder housing;
   machining the internal wall of the rebored housing to form threads therein;
   providing a sleeve member of desired physical characteristics and desired internal configuration and dimensions;
   machining the external surface of said sleeve member to form threads thereon which mate with the threads machined in the interior wall of the housing;
   forming at least a portion of the threads of the housing and the sleeve member to have rounded peaks and valleys of differing radii of curvature so that at least one helical tunnel is formed between the sleeve member and the housing when the sleeve member is inserted into the housing;
   providing a seal between the interior of the sleeve member and said helical tunnel at the end of the sleeve which is subjected to high pressures in the course of operation of said piston;
   inserting said sleeve member into said rebored housing with the ends of said sleeve member not abutting against a surface of the housing with sufficient force to produce substantial axial forces on the flanks of said threads;
   said threads on said sleeve and said housing being configured such that when said sleeve is inserted in said housing there is contact between the surfaces of said housing along a substantial portion of both flanks of the threads on said sleeve to absorb deformation pressures; and
   venting the helical tunnel to a region of lower pressure than that to which the one end of said sleeve is exposed to prevent the buildup of pressure between the external surface of said sleeve and the internal wall of said housing.

2. The method of claim 1 wherein the sleeve member is internally configured and dimensioned to duplicate the internal configuration and dimensions of the original cylinder wall.

3. The method of claim 1 wherein the reboring step includes the step of providing a sealing surface at one end of the cylinder housing, the method further including the step of
   inserting said seal between the sleeve member and the sealing surface.

4. The method of claim 1 wherein said seal is constructed and arranged to provide a unidirectional seal effect from the interior of the sleeve member to the at least one helical tunnel.

5. The method of claim 1 wherein the reboring step includes the step of providing an annular groove at one end of the cylinder housing, the method further including the step of
   inserting an annular seal in said groove between the sleeve member and the housing, said seal arranged to provide a unidirectional seal effect from the interior of the sleeve member to the at least one helical tunnel.

6. The method of claim 5 wherein fluid communication is provided between the interior of said sleeve and said annular groove.

7. A method for repairing an internal wall of a cylinder adapted to receive a piston comprising the steps of:
   reboring the cylinder housing;
   machining the internal wall of the rebored housing to form a plurality of annular grooves therein;
   providing a sleeve member of desired physical characteristics and desired internal configuration and dimensions;
   machining the external surface of said sleeve member to form a plurality of annular grooves thereon which mate with the grooves machined in the interior wall of the housing;
   forming at least a portion of the grooves of the housing and the sleeve member to have rounded peaks and valleys of differing radii of curvature so that a plurality of tunnels are formed between the sleeve member and the housing when the sleeve member is inserted into the housing;
   inserting said sleeve member into said rebored housing with the ends of said sleeve member not abutting against a surface of the housing with sufficient force to produce substantial axial forces on the flanks of said grooves;
   said grooves on said sleeve and said housing being configured such that when said sleeve is inserted in said housing there is contact between the surfaces of said housing and both flanks of the grooves on said sleeve to absorb deformation pressures;
   providing fluid communication between at least a portion of said tunnels and the interior of said sleeve;
   providing a seal between the interior of the sleeve member and said at least a portion of said tunnels at the end of the sleeve which is subjected to high pressures in the course of operation of said piston; and
   venting said at least a portion of said tunnels to a region of lower pressure than that to which the one end of said sleeve is exposed to prevent the buildup of pressure between the external surface of said sleeve and the internal wall of said housing.

8. The method of claim 7 wherein the sleeve member is internally configured and dimensioned to duplicate the internal configuration and dimensions of the original cylinder wall.

9. The method of claim 7 wherein the reboring step includes the step of providing a sealing surface at one end of the cylinder housing, the method further including the step of
   inserting said seal between the sleeve member and the sealing surface.

10. The method of claim 9 wherein said seal is constructed and arranged to provide a unidirectional seal effect from the interior of the sleeve member to the tunnels.

11. The method of claim 7 wherein the reboring step includes the step of providing an annular groove at one end of the cylinder housing, the method further including the step of inserting an annular seal in said groove between the sleeve member and the housing, said seal arranged to provide a unidirectional seal effect from the interior of the sleeve member to the tunnels.

12. The method of claim 11 wherein fluid communication is provided between the interior of said sleeve and said annular groove.

* * * * *